(12) United States Patent
Nakayasu

(10) Patent No.: US 7,379,755 B2
(45) Date of Patent: May 27, 2008

(54) MOBILE COMMUNICATION SYSTEM, RADIO BASE STATION CONTROLLER AND TRANSMITTING AND RECEIVING POWER CONTROL METHOD THEREFOR

(75) Inventor: Kanada Nakayasu, Tokyo (JP)

(73) Assignee: NEC Corporation (JP)

( * ) Notice: Subject to any disclaimer, the term of this patent is extended or adjusted under 35 U.S.C. 154(b) by 231 days.

(21) Appl. No.: 10/782,427

(22) Filed: Feb. 18, 2004

(65) Prior Publication Data

US 2004/0166899 A1 Aug. 26, 2004

(30) Foreign Application Priority Data

Feb. 19, 2003 (JP) ............................. 2003-040473

(51) Int. Cl.
*H04B 7/00* (2006.01)
(52) U.S. Cl. ................. 455/560; 455/452.1; 455/452.2
(58) Field of Classification Search ................ 455/560, 455/522, 69, 67.11, 447, 452.1, 517, 452.2, 455/63.1; 370/311, 328
See application file for complete search history.

(56) References Cited

U.S. PATENT DOCUMENTS

| | | | |
|---|---|---|---|
| 5,333,175 A | 7/1994 | Ariyavisitakul et al. | 379/58 |
| 5,621,764 A * | 4/1997 | Ushirokawa et al. | 375/317 |
| 5,812,938 A * | 9/1998 | Gilhousen et al. | 455/69 |
| 5,946,346 A | 8/1999 | Ahmed et al. | 375/219 |
| 6,131,015 A * | 10/2000 | Hill et al. | 455/69 |
| 6,154,450 A * | 11/2000 | Wallentin et al. | 370/311 |
| 6,374,118 B1 * | 4/2002 | Toskala et al. | 455/522 |
| 6,850,736 B2 * | 2/2005 | McCune, Jr. | 455/67.13 |

2002/0147025 A1 10/2002 Savas

FOREIGN PATENT DOCUMENTS

| | | |
|---|---|---|
| EP | 1 244 232 A1 | 6/2002 |
| JP | 2000-091985 | 3/2000 |
| JP | 2001-119342 | 4/2001 |

(Continued)

OTHER PUBLICATIONS

Office Action issued by Chinese Patent Office on Jan. 20, 2006 in connection with corresponding Chinese application No. 200410004431.1.

(Continued)

*Primary Examiner*—Congvan Tran
(74) *Attorney, Agent, or Firm*—Ostrolenk, Faber, Gerb & Soffen, LLP

(57) ABSTRACT

The present invention provides a mobile communication system that can efficiently control the conflicting abilities of making the high quality communication and keeping the number of accommodating the mobile terminals.

A radio quality measuring part of a mobile terminal requests a radio base station to increase or decrease the transmitting power to attain a needed receiving quality. A radio quality control part controls the receiving quality so that the bearer quality may attain the required quality on the basis of the bearer quality measured by a bearer quality control part. The radio base station always monitors the quality for a radio section. When this radio quality exceeds a threshold specified by a radio base station controller, the radio base station reports to the radio base station controller the worsening or improvement of the radio quality via a radio base station protocol terminator with a radio quality report.

14 Claims, 11 Drawing Sheets

FOREIGN PATENT DOCUMENTS

| | | |
|---|---|---|
| JP | 2002-368685 | 12/2002 |
| JP | 2003-023659 | 1/2003 |
| WO | WO 02/082685 A1 | 10/2002 |

OTHER PUBLICATIONS

English translation of Chinese Office Action dated Jan. 20, 2006 issued in connection with corresponding Chinese applicatin No. 200410004431.1.

European Search Report issued Jun. 22, 2004 in related European Application No. 04003670.9-1525.

Office Action issued by Japanese Patent Office on Dec. 18, 2007 in connectiin with corresponding Japanese application No. 2003-040473.

English translation of relevant portions of Japanese Office Action submitted in lieu of statement of relevancy of the present invention to the teachings of the cited prior art.

* cited by examiner

BEARER QUALITY MANAGEMENT TABLE B

| RADIO QUALITY REPORT VALUE | BEARER QUALITY (BLER) |
|---|---|
| x | 0.0 |
| y | 0.05 |
| z | 0.1 |

FIG. 7

BEARER QUALITY MANAGEMENT
TABLE C

| RADIO QUALITY REPORT VALUE | SERVICE CLASS | BEARER QUALITY (BLER) |
|---|---|---|
| x | 1, 2 | 0.0 |
| y | 1 | 0.0 |
|   | 2 | 0.05 |
| z | 1 | 0.05 |
|   | 2 | 0.1 |

FIG. 11

BEARER QUALITY MANAGEMENT TABLE D

| RADIO QUALITY REPORT VALUE | BEARER QUALITY (BLER) |
|---|---|
| x x | 0. 0 |
| y y | 0. 05 |
| z z | 0. 1 |

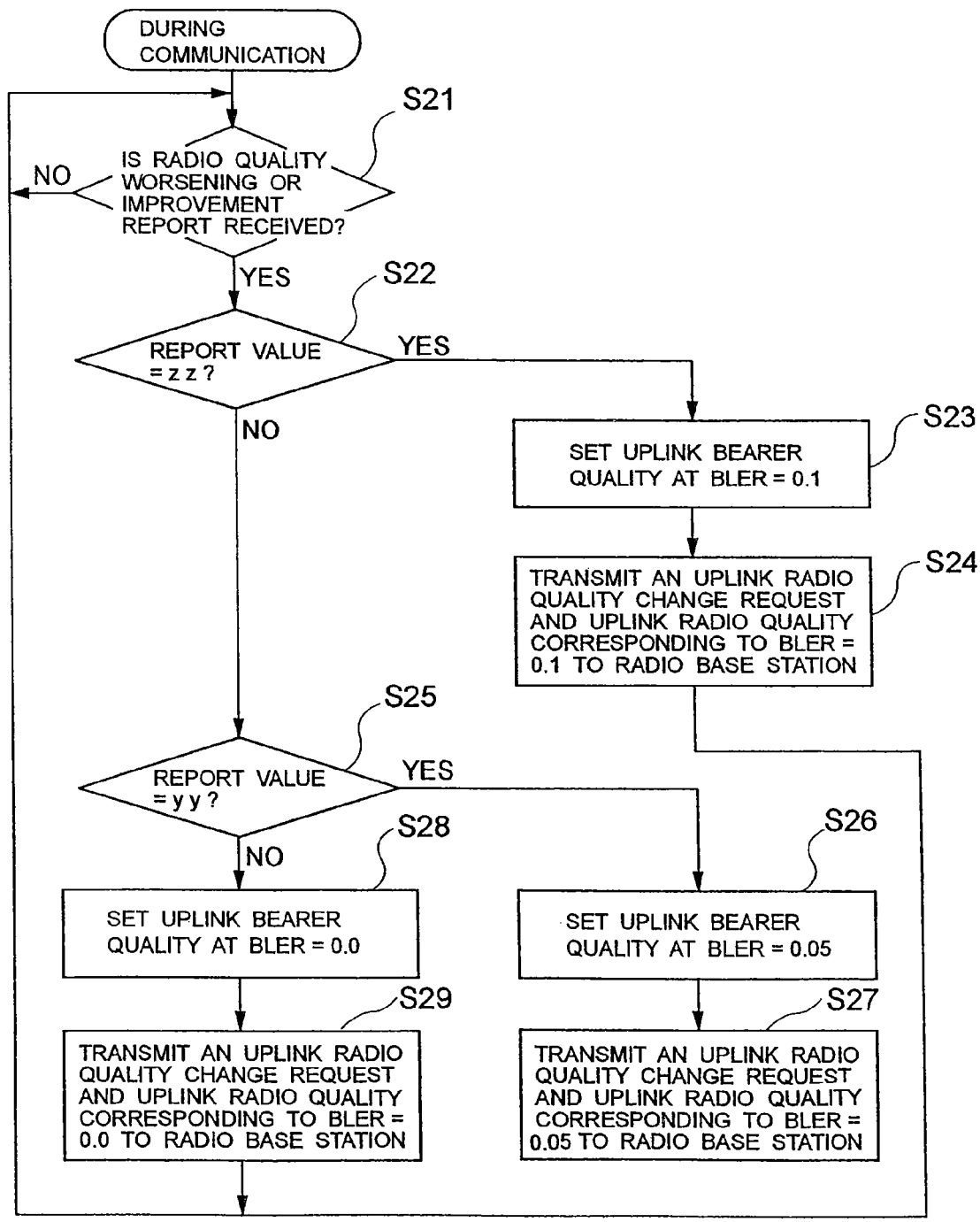

MOBILE COMMUNICATION SYSTEM, RADIO BASE STATION CONTROLLER AND TRANSMITTING AND RECEIVING POWER CONTROL METHOD THEREFOR

BACKGROUND OF THE INVENTION

1. Field of the Invention

The present invention relates to a mobile communication system, a radio base station controller and a transmitting and receiving power control method therefor, and more particularly to a transmitting and receiving power control method in a CDMA (Code Division Multiple Access) system.

2. Description of the Related Art

Conventionally, in a CDMA radio access system, a number of radio base stations and mobile terminals make the communications by setting up the link at the same frequency, whereby a receiving power (desired wave power) of signal in a certain line may interfere with another line and become an interference wave power. Therefore, in a satellite uplink in which the mobile terminal transmits and the radio base station receives, if a desired wave power exceeds a predetermined value, the interference wave power is increased and the capacity of line is decreased.

In order to solve this problem, in the conventional CDMA radio access system, a method for increasing the capacity of uplink by preventing the use of excessive transmitting power in transmission from the mobile terminal to the radio base station has been offered (e.g., refer to patent document 1).

With this method, the radio base station compares the receiving quality of a transmitting signal from the mobile terminal with the target receiving quality, in which an increased amount of transmitting power at the radio base station is decided based on its comparison result, the increased amount is added to the transmitting power at the radio base station upon a control instruction transmitted from the mobile terminal, and a control instruction for controlling the transmitting power at the mobile terminal is transmitted by the added transmitting power.

[Patent Document 1]

Japanese Patent Laid-Open No. 2001-119342 (pages 19 and 20, FIG. 5)

In the above-mentioned conventional CDMA radio access system, the user is discriminated according to the code at the same frequency, whereby one mobile terminal or radio base station is affected by interference powers from other users, so that the communication quality is deteriorated.

That is, if the high quality communication tries to be made, the transmitting power of the radiobase station or mobile terminal is increased, and the interference power is increased at the same time, so that the maximum number of accommodating the mobile terminals at one radio base station is decreased. If the number of accommodating the mobile terminals is increased, the power assigned to each mobile terminal is smaller, resulting in a problem that the communication quality is deteriorated.

SUMMARY OF THE INVENTION

Thus, the invention has been achieved to solve the above-mentioned problems, and it is an object of the invention to provide a mobile communication system, a radio base station controller and a transmitting and receiving power control method therefor, in which the conflicting abilities of making the higher quality communication and keeping the accommodation number of mobile terminals are controlled efficiently.

According to the present invention, there is provided a mobile communication system comprising a radio base station controller for performing at least a radio line control and a resource control for the radio base station, and at least a radio line control, a resource control and a bearer control for a mobile terminal, wherein the radio base station controller comprises control means for controlling a communication quality between the radio base station and the mobile terminal on the basis of the information regarding the amount of interference from the radio base station.

The invention provides a radio base station controller for performing at least a radio line control and a resource control for the radio base station, and at least a radio line control, a resource control and a bearer control for a mobile terminal, wherein the radio base station controller comprises control means for controlling a communication quality between the radio base station and the mobile terminal on the basis of the information regarding the amount of interference from the radio base station.

The invention provides a transmitting and receiving power control method for use in a mobile communication system comprising a radio base station controller for performing at least a radio line control and a resource control for the radio base station, and at least a radio line control, a resource control and a bearer control for a mobile terminal, the method comprising, on the side of the radio base station controller, a step of controlling a communication quality between the radio base station and the mobile terminal on the basis of the information regarding the amount of interference from the radio base station.

That is, the mobile communication system of the invention employs a radio access method in the CDMA (Code Division Multiple Access) system. In this CDMA system, the user is discriminated according to the code at the same frequency, whereby one mobile terminal or radio base station is affected by interference powers from other users. Under the influence of the interference powers, the maximum number of users that can be accommodated in the radio base station is limited to some extent in the CDMA system.

Usually, to increase the maximum number of users, the mobile terminal or radio base station employs a function of Outer Loop control for controlling the transmitting power of the distant party on the basis of the required quality for each communication bearer to enable the communication with the minimum needed receiving power.

Herein, the Outer Loop control constitutes a Closed Loop transmitting power control together with the Inner Loop control. In the Inner Loop control, SIR (Signal-to-Interference power Ratio) on a receiving communication channel is controlled to take a target value, while in the Outer Loop control, the target SIR is controlled so that the communication quality [BER (Bit Error Rate), BLER (Block Error Rate)] may take a target value. In this case, the communication quality is measured in a longer interval (from several 100 ms to a few seconds) to set the target SIR appropriate to attain the target quality.

In the mobile communication system of the invention, the Outer Loop function is operated adaptively by the interference power or transmitting power at a certain time, whereby it is possible to control efficiently the conflicting system abilities of making the communication at the maximum communication quality when there is a small amount of interference within the radio base station, and keeping the maximum accommodation number by degrading the communication quality when there is a great amount of interference.

Thereby, in the mobile communication system of the invention, the CDMA radio access system provides the control to make the high quality communication by maximizing the bearer required quality of the mobile terminal when the amount of interference is relatively small, and to increase the number of accommodating the users by degrading the bearer required quality to a needed minimum level in the order from the mobile terminal of lower service class during communication when there is a great interference wave due to an increased number of users, whereby the conflicting system abilities of making the high quality communication and keeping the maximum number of accommodating the mobile terminals are controlled efficiently.

BRIEF DESCRIPTION OF THE DRAWINGS

FIG. 7 shows the configuration of a bearer quality management table within the radio base station controller according to another embodiment of the invention;

FIG. 11 shows the configuration of a bearer quality management table within the radio base station controller of FIG. 9; and FIG. 12 is a flowchart showing the operation of the radio base station controller of FIG. 9.

DETAILED DESCRIPTION OF THE PREFERRED EMBODIMENTS

Figure 1:
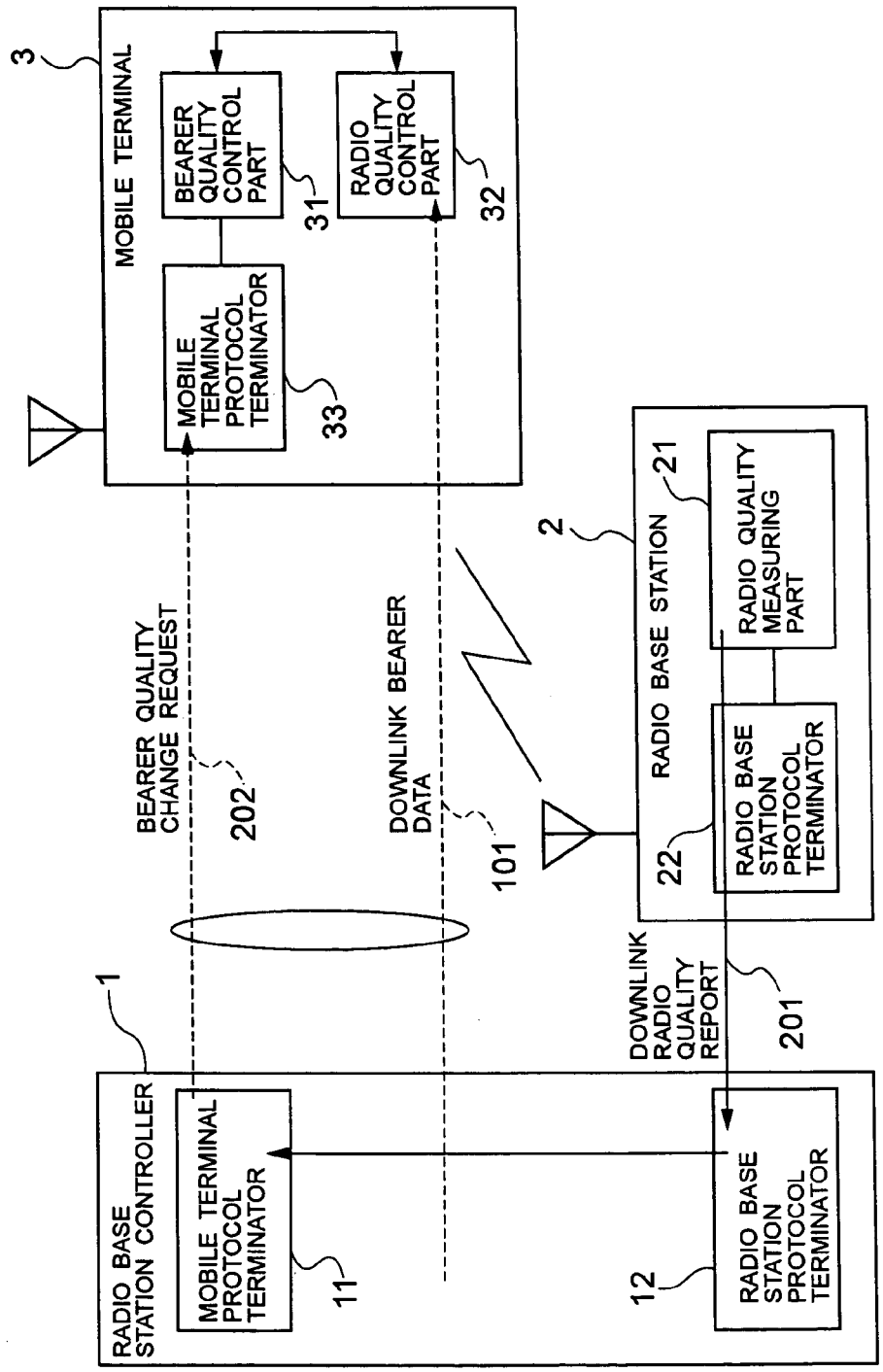
FIG. 1 is a block diagram showing the configuration of a mobile communication system according to one embodiment of the present invention.

The preferred embodiments of the present invention will be described below with reference to the accompanying drawings. FIG. 1 is a block diagram showing the configuration of a mobile communication system according to one embodiment of the invention. In FIG. 1, the mobile communication system according to one embodiment of the invention comprises a radio base station controller 1, a radio base station 2, and a mobile terminal 3.

The radio base station controller 1 comprises a mobile terminal protocol terminator 11 and a radio base station protocol terminator 12. The radio base station 2 comprises a radio quality measuring part 21 and a radio base station protocol terminator 22. The mobile terminal 3 comprises a bearer quality control part 31, a radio quality control part 32 and a mobile terminal protocol terminator 33.

The radio base station controller 1 makes a radio line control and a resource control for the radio base station 2 via the radio base station protocol terminator 12, and makes a radio line control, a resource control and a bearer control for the mobile terminal 3 via the mobile terminal protocol terminator 11.

Figure 2:
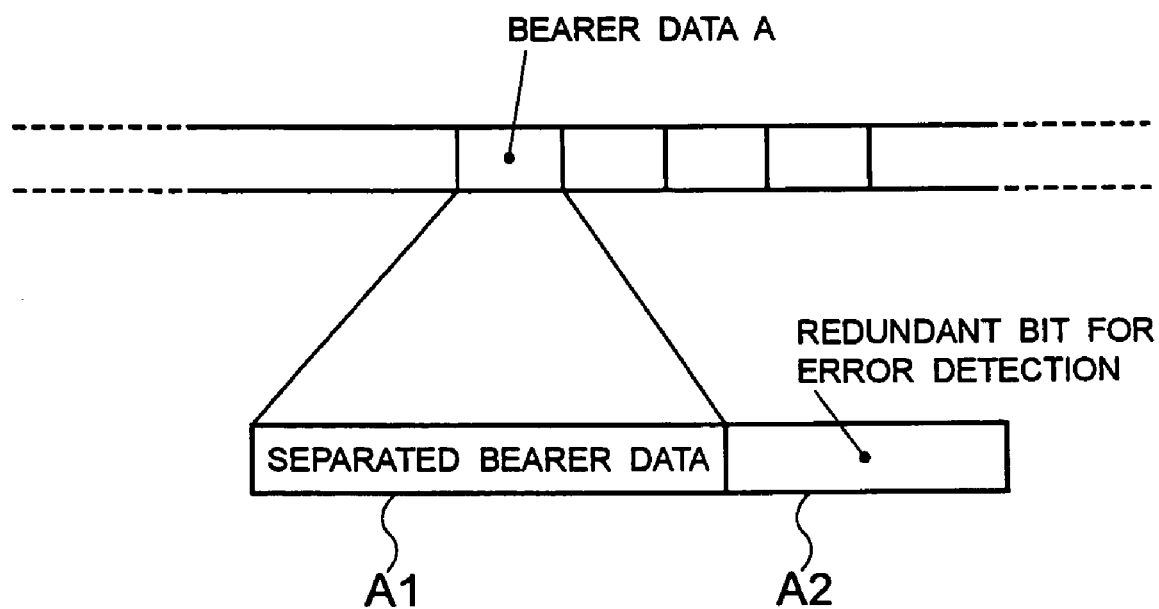
FIG. 2 shows a data format flowing on a radio line between a radio base station and a mobile terminal.

FIG. 2 is a chart showing a data format flowing on the radio line between the radio base station 2 and the mobile terminal 3 as shown in FIG. 1. Referring to FIGS. 1 and 2, the operation of the mobile communication system according to one embodiment of the invention will be now described.

Herein, while the mobile terminal 3 is communicating via the radio base station 2, the radio base station 2 divides bearer data A into radio blocks of predetermined length (divided bearer data) A1, in which the bearer data A, to which a redundant bit A2 for error detection is added to each radio block, is spreaded using a spreading code for the mobile terminal 3 and transmitted over the radio line.

At the mobile terminal 3, the bearer quality control part 31 detects the presence or absence of a block error for each radio block based on a redundant bit A2 for error detection, and measures the BLER (Block Error Rate) for a certain period. Also, the mobile terminal 3 has a function of requesting the radio base station 2 to increase or decrease the transmitting power, the radio quality control part 32 of the mobile terminal 3 requests the radio base station 2 to increase or decrease the transmitting power so as to have a required receiving quality (receiving level).

Moreover, at the mobile terminal 3, the radio quality control part 32 controls the receiving quality (receiving level) so that the bearer quality may be required quality based on the quality of bearer measured by the bearer quality control part 31.

Additionally, the radio base station 2 always monitors the quality for the radio section between the radio base station 2 and the mobile terminal 3. When the radio quality exceeds a threshold value specified beforehand from the radio base station controller 1, the radio base station 2 reports to the radio base station controller 1 via the radio base station protocol terminator 22 with a radio quality report 201 to make the radio quality better or worse.

Furthermore, the mobile terminal 3 has a function of changing the required bearer quality upon a bearer quality change request 202 from the radio base station controller 1 via the mobile terminal protocol terminator 33.

Figure 3:
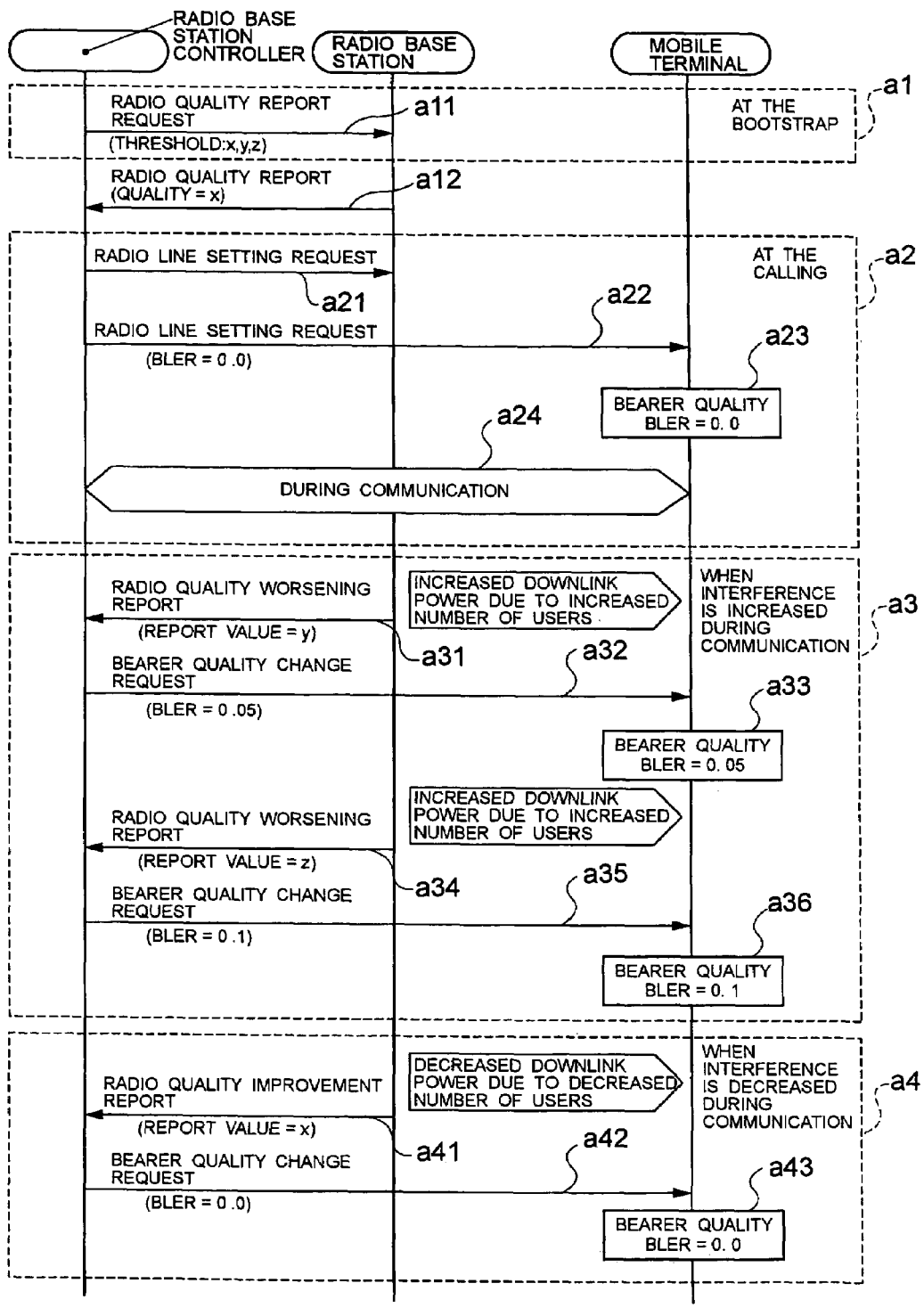
FIG. 3 is a sequence chart showing the operation of the mobile communication system according to the embodiment of the invention.
Figures 4, 5:
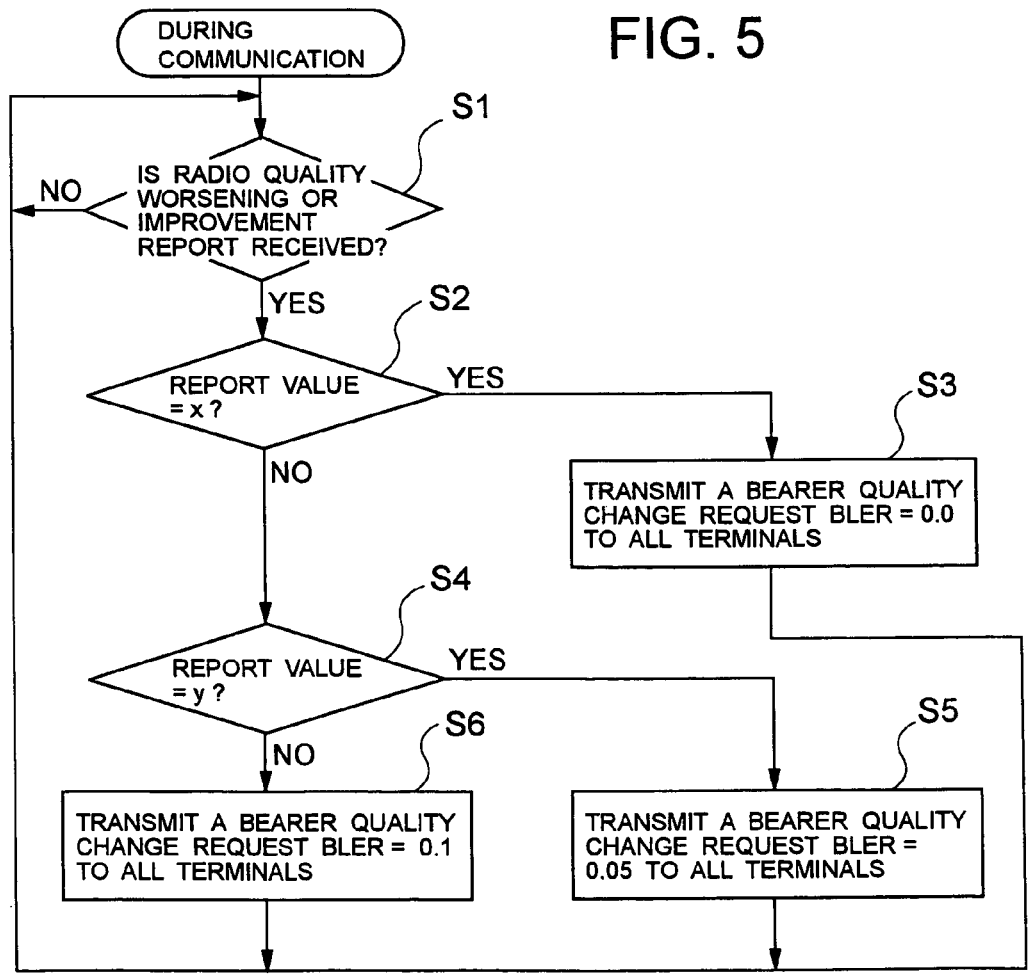
FIG. 4 shows the configuration of a bearer quality management table within a radio base station controller of FIG. 1.
FIG. 5 is a flowchart showing the operation of the radio base station controller of FIG. 1.

FIG. 3 is a sequence chart showing the operation of the mobile communication system according to one embodiment of the invention, FIG. 4 shows the configuration of a bearer quality management table within the radio base station controller 1 of FIG. 1, and FIG. 5 is a flowchart showing the operation of the radio base station controller 1 of FIG. 1. Referring to FIGS. 1 to 5, the operation of the mobile communication system according to one embodiment of the invention will be described below.

At the bootstrap (a1 in FIG. 3) of radio line performed by the radio base station controller 1, a radio quality report request is made to the radio base station 2 via the radio base station protocol terminator 12, in which a periodical report or a threshold information (Threshold: x, y, z) for reporting when the threshold of the radio quality is exceeded is included (all in FIG. 3). The radio base station 2 reports the radio quality report (quality=X) to the radio base station controller 1 in response to the request (a12 in FIG. 3).

When one mobile terminal 3 makes a call via the radio base station 2 (a2 in FIG. 3), first of all, the radio base station controller 1 decides the bearer quality (BLER=0.0) of the mobile terminal 3, using the latest radio quality=x from the radio base station 2 and the bearer quality management table B (see FIG. 4) possessed by itself, and transmits a radio line setting request to the radio base station 2 via the radio base station protocol terminator 12 (a21 in FIG. 3), and a radio line setting request to the mobile terminal 3 via the mobile terminal protocol terminator 11 (a22 in FIG. 3). In this state, the mobile terminal 3 makes the stable communication with reception BLER=0.0 (a23, a24 in FIG. 3).

For example, when the amount of interference is increased due to concentrated accesses from other users while the mobile terminal 3 is communicating (a3 in FIG. 3), and when the radio quality being measured by the radio quality measuring part 21 of the radio base station 2 exceeds Threshold=y, the radio base station 2 issues a radio quality worsening report (report value=y) to the radio base station controller 1 (a31 in FIG. 3). If the radio base station controller 1 receives the radio quality worsening report (step S1 in FIG. 5), it transmits a bearer quality change request (BLER=0.05) to the mobile terminal 3, using the bearer quality management table B (a32 in FIG. 3) (steps S4, S5 in FIG. 5).

If the mobile terminal 3 receives the bearer quality change request (BLER=0.05), it resets the bearer quality at BLER=0.05 (a33 in FIG. 3). Also, the bearer quality control part 31 within the mobile terminal 3 makes a request to the radio quality control part 32 to decrease the required receiving quality. Thereby, the bearer quality is decreased, but the downlink transmitting power of the radio base station 2 is decreased to reduce the interference, making it possible to increase the number of mobile terminals accommodated.

Moreover, if the radio quality being measured by the radio quality measuring part 21 of the radio base station 2 exceeds Threshold=z, the radio base station 2 reissues a radio quality worsening report (report value=z) to the radio base station controller 1 (a34 in FIG. 3) (step Si in FIG. 5). If the radio base station controller 1 receives the radio quality worsening report, it transmits a bearer quality change request (BLER=0.1) to the mobile terminal 3, using the bearer quality management table B (a35 in FIG. 3) (steps S4, S6 in FIG. 5).

If the mobile terminal 3 receives the bearer quality change request (BLER=0.1), it resets the bearer quality at BLER=0.1 (a36 in FIG. 3). Thereby, for the mobile terminal 3, the bearer quality is decreased to BLER=0.1 and the downlink transmitting power is reduced, whereby the number of mobile terminals accommodated is increased.

Lastly, when there is less interference from other users and the radio quality being measured by the radio quality measuring part 21 of the radio base station 2 is below Threshold=x, the radio base station 2 issues a radio quality improvement report (report value=x) to the radio base station controller 1 (a41 in FIG. 3). If the radio base station controller 1 receives the radio quality improvement report (step S1 in FIG. 5), it transmits a bearer quality change request (BLER=0.0) to the mobile terminal 3, using the bearer quality management table B (a42 in FIG. 3) (steps S2, S3 in FIG. 5).

If the mobile terminal 3 receives the bearer quality change request (BLER=0.0), it resets the bearer quality at BLER=0.0 (a43 in FIG. 3). Thereby, the required receiving quality of the mobile terminal 3 is increased (BLER=0.0), enabling stable communication again.

In this way, in this embodiment, the CDMA radio access system provides the control to make the high quality communication by maximizing the bearer required quality of the mobile terminal 3 when the amount of interference is relatively small, and to increase the number of users accommodated by degrading the bearer required quality to the needed minimum from the mobile terminal 3 during communication in the order of lower service class when there is a greater interference wave due to an increased number of users, whereby the conflicting system abilities of making the high quality communication and keeping the maximum number of mobile terminals accommodated are controlled efficiently.

Figure 6:
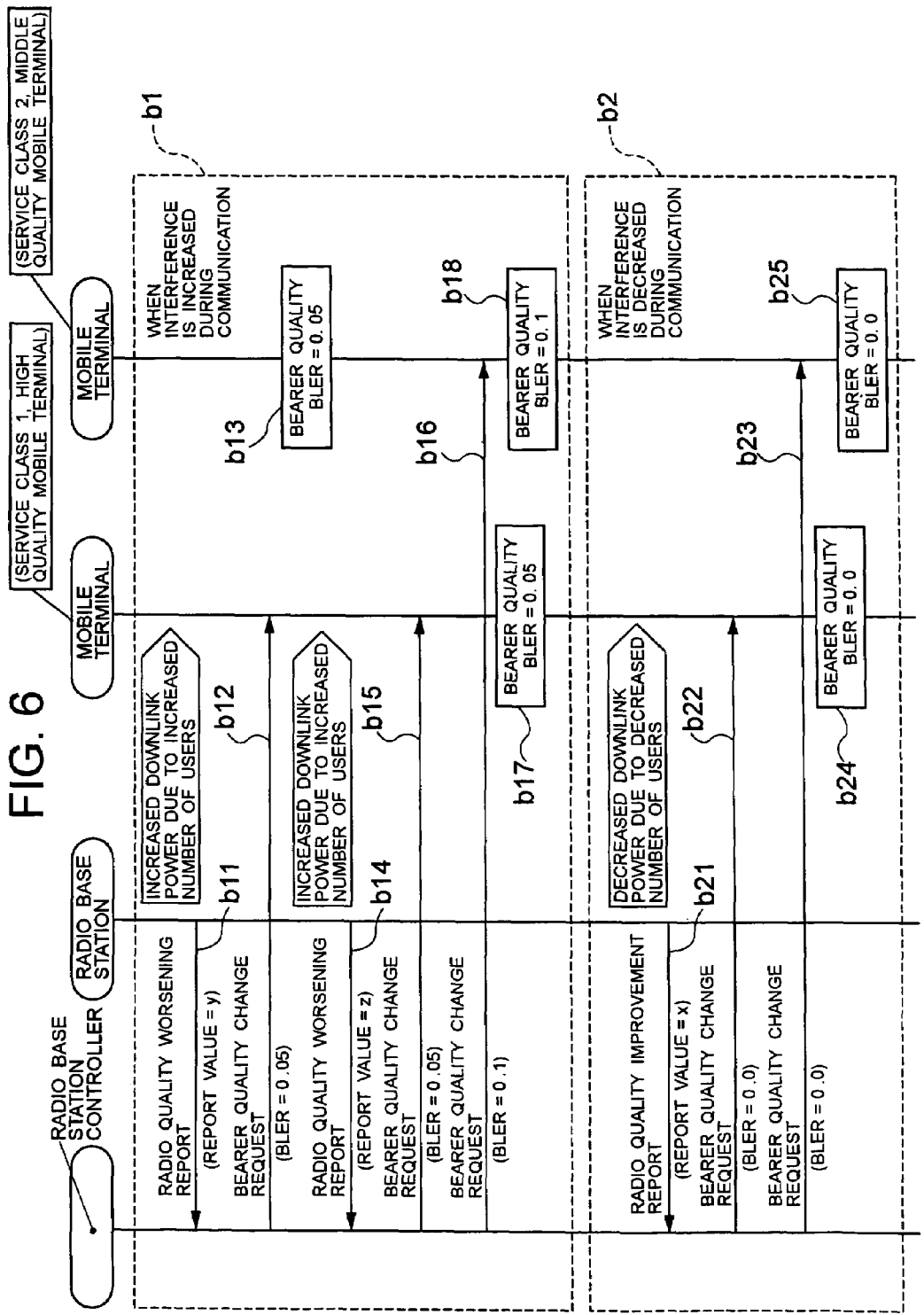
FIG. 6 is a sequence chart showing the operation of the mobile communication system according to another embodiment of the invention.
Figure 8:
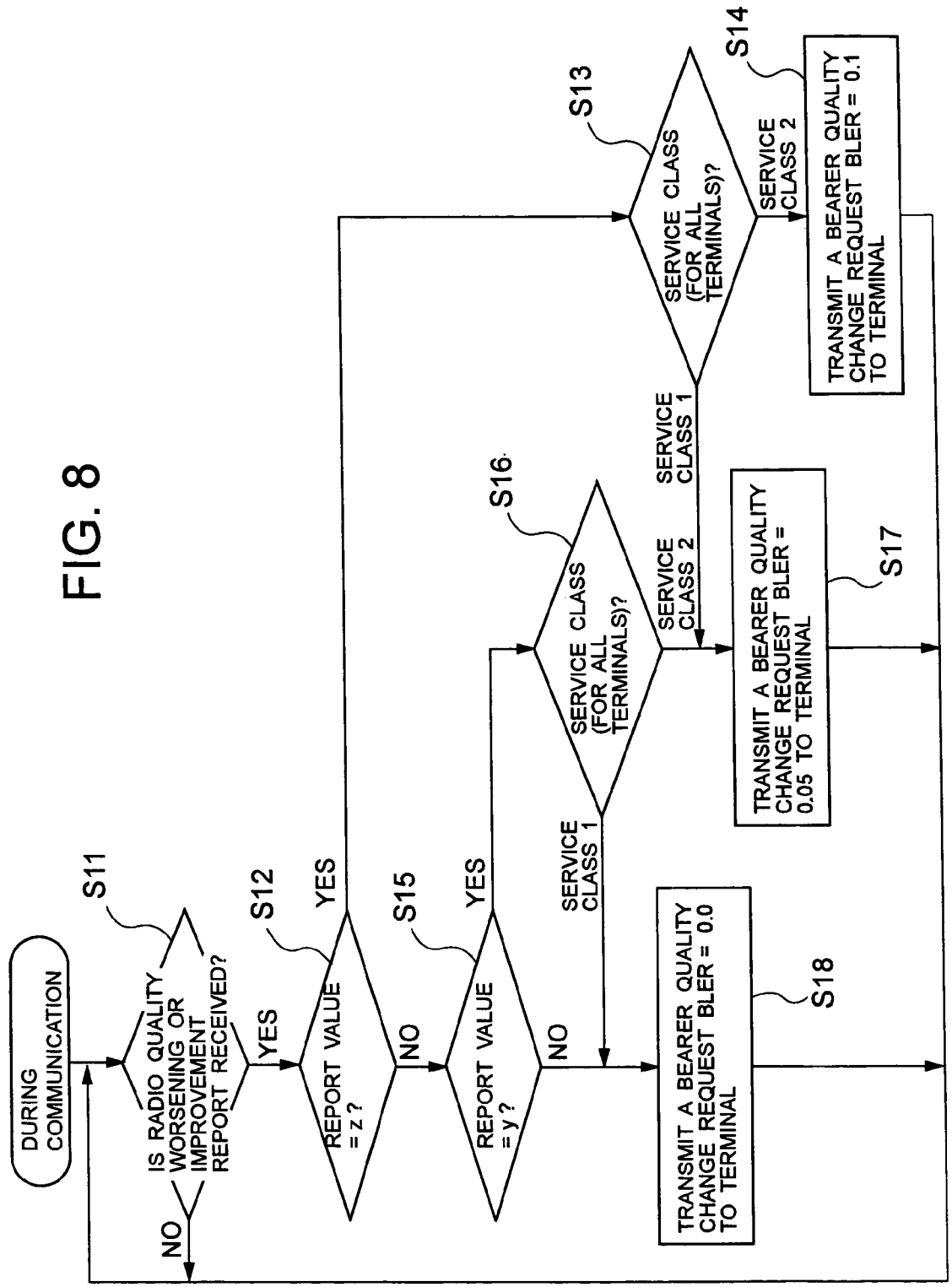
FIG. 8 is a flowchart showing the operation of the radio base station controller according to another embodiment of the invention.

FIG. 6 is a sequence chart showing the operation of a mobile communication system according to another embodiment of the invention, FIG. 7 shows the configuration of a bearer quality management table within the radio base station controller according to another embodiment of the invention, and FIG. 8 is a flowchart showing the operation of the radio base station controller according to another embodiment of the invention. The system configuration according to another embodiment of the invention is the same as the system configuration according to one embodiment of the invention as shown in FIG. 1. Referring to FIG. 1 and FIGS. 6 to 8, the operation of the mobile communication system according to another embodiment of the invention will be described below.

Usually, the mobile terminals 3 include the mobile terminal requiring high quality, the mobile terminal emphasizing the connection time even with a middle degree of quality, and are often classified for each service class. Thus, in another embodiment of the invention, as the bearer quality management table provided for the radio base station controller 1, the bearer quality management table B is partitioned into the bearer quality management table C for each service class (see FIG. 7).

For example, when the amount of interference is increased due to concentrated accesses from other users while the mobile terminal is communicating, and when the radio quality being measured by the radio quality measuring part 21 of the radio base station 2 exceeds Threshold=y, the radio base station 2 issues a radio quality worsening report (report value=y) to the radio base station controller 1 (b11 in FIG. 6).

If the radio base station controller 1 receives the radio quality worsening report (step S11 in FIG. 8), it maintains the high quality communication to the mobile terminal having a high service class (service class 1), using the bearer quality management table C by keeping the existent bearer quality (BLER=0.0) for the radio quality worsening report (report value=y) from the radio base station 2 (b11 in FIG. 6) (steps S15, S16, S18 in FIG. 8).

In this case, if the radio base station controller 1 receives the radio quality worsening report (report value=y) from the radio base station 2, it requests a bearer quality change request (BLER=0.05) to the mobile terminal having a low service class (service class 2) (b12 in FIG. 6) (steps S15, S16, S17 in FIG. 8), thereby enabling the minute control in consideration of the service class of the mobile terminal.

If the mobile terminal (service class 2) receives the bearer quality change request (BLER=0.05), it resets the bearer quality at BLER=0.05 (b13 in FIG. 6). Also, the bearer quality control part 31 within the mobile terminal (service class 2) makes a request to the radio quality control part 32, to decrease the required receiving quality. Thereby, the bearer quality of the mobile terminal (service class 2) is decreased to BLER=0.1, but the downlink transmitting power is further decreased, making it possible to increase the number of mobile terminals accommodated.

Moreover, if the radio quality being measured by the radio quality measuring part 21 of the radio base station 2 exceeds Threshold=z, the radio base station 2 reissues a radio quality worsening report (report value=z) to the radio base station controller 1 (b14 in FIG. 6) (step S11 in FIG. 8).

If the radio base station controller 1 receives the radio quality worsening report, it transmits a bearer quality change request (BLER=0.05) to the mobile terminal having a high service class (service class 1), using the bearer quality management table C (b15 in FIG. 6) (steps S12, S13, S17 in FIG. 8).

If the mobile terminal (service class 1) receives the bearer quality change request (BLER=0.05), it resets the bearer quality at BLER=0.05 (b17 in FIG. 6). Also, the bearer quality control part 31 within the mobile terminal (service class 1) makes a request to the radio quality control part 32 to decrease the required receiving quality. Thereby, for the mobile terminal (service class 1), the bearer quality is decreased to BLER=0.05, but the downlink transmitting power by the radio base station 2 is reduced to have less interference, whereby the number of mobile terminals accommodated is increased.

In this case, if the radio base station controller 1 receives the radio quality worsening report (report value=z) from the radio base station 2, it requests a bearer quality change request (BLER=0.1) to the mobile terminal having a low service class (service class 2) (b16 in FIG. 6) (steps S12, S13, S14 in FIG. 8), thereby enabling the minute control in consideration of the service class of the mobile terminal.

If the mobile terminal (service class 2) receives the bearer quality change request (BLER=0.1), it resets the bearer quality at BLER=0.1 (b18 in FIG. 6). Also, the bearer quality control part 31 within the mobile terminal (service class 2) makes a request to the radio quality control part 32, to decrease the required receiving quality. Thereby, the bearer quality of the mobile terminal (service class 2) is decreased, but the downlink transmitting power by the radio base station 2 is further decreased to have less interference, making it possible to increase the number of mobile terminals accommodated.

Lastly, when there is less interference from other users and the radio quality being measured by the radio quality measuring part 21 of the radio base station 2 is below Threshold, the radio base station 2 issues a radio quality improvement report (report value=x) to the radio base station controller 1 (b21 in FIG. 6). If the radio base station controller 1 receives the radio quality improvement report (step S11 in FIG. 8), it transmits a bearer quality change request (BLER=0.0) to all the mobile terminals 3, using the bearer quality management table C (b22, b23 in FIG. 6) (steps S15, S18 in FIG. 8).

If all the mobile terminals receive the bearer quality change request (BLER=0.0), they reset the bearer quality at BLER=0.0 (b24, b25 in FIG. 6). Thereby, the required receiving qualities of all the mobile terminals are increased (BLER=0.0), enabling the stable communication again. As described above, the minute control is enabled in consideration of the service class of the mobile terminal in this embodiment.

Figure 9:
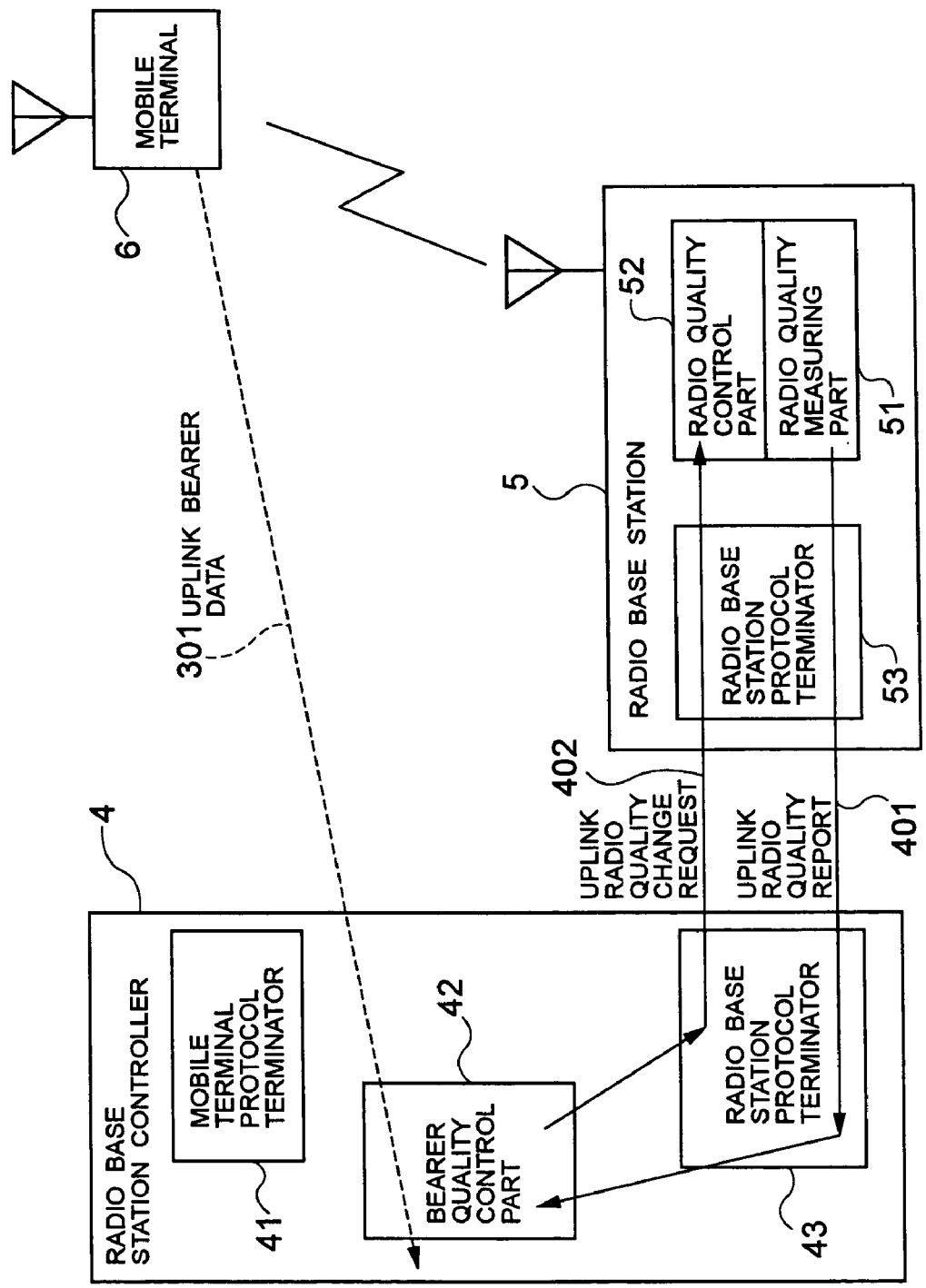
FIG. 9 is a block diagram showing the operation of a mobile communication system according to another embodiment of the invention.

FIG. 9 is a block diagram showing the configuration of a mobile communication system according to another embodiment of the invention. In FIG. 9, the mobile communication system according to another embodiment of the invention comprises a radio base station controller 4, a radio base station 5 and a mobile terminal 6.

The radio base station controller 4 comprises a mobile terminal protocol terminator 41, a bearer quality control part 42, and a radio base station protocol terminator 43. The radio base station 5 comprises a radio quality measuring part 51, a radio quality control part 52, and a radio base station protocol terminator 53. The configuration of the mobile terminal 6 is not directly related with the control in this embodiment, and not shown in the figure.

In the mobile communication system according to another embodiment of the invention, the power control with radio quality or bearer quality is applied to the upline (in a transmission direction from the mobile terminal 6 to the radio base station 5).

Figure 10:
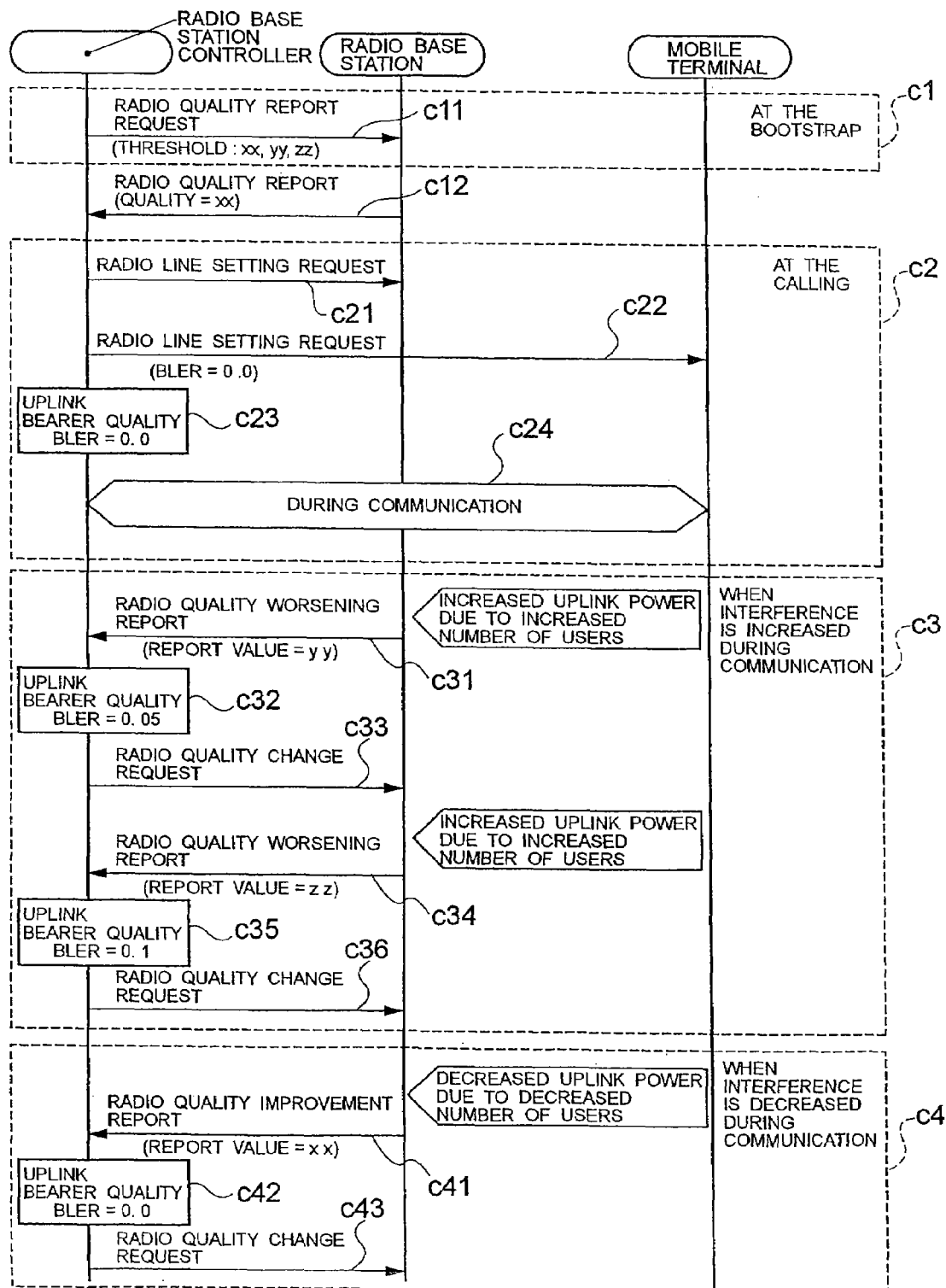
FIG. 10 is a sequence chart showing the operation of the mobile communication system according to another embodiment of the invention.

FIG. 10 is a sequence chart showing the operation of the mobile communication system according to another embodiment of the invention, FIG. 11 shows a bearer quality management table within the radio base station controller 4 of FIG. 9, and FIG. 12 is a flowchart showing the operation of the radio base station controller 4 of FIG. 9. Referring to FIGS. 9 to 12, the operation of the mobile communication system according to another embodiment of the invention will be described below.

At the bootstrap (c1 in FIG. 10) of radio line performed by the radio base station controller 4, a radio quality report request is made to the radio base station 5 via the radio base station protocol terminator 43, in which the radio quality report request has threshold information (Threshold: xx, yy, zz) for reporting when a periodical report or threshold of the radio quality is exceeded (c11 in FIG. 10). The radio base station 5 reports the radio quality report (quality=xx) to the radio base station controller 4 in response to the request (c12 in FIG. 10).

When one mobile terminal 6 makes a call via the radio base station 5 (c2 in FIG. 10), first of all, the radio base station controller 4 decides the bearer quality (BLER=0.0) of the mobile terminal 6, using the latest radio quality=xx from the radio base station 5 and the bearer quality management table D (see FIG. 11) possessed by itself, and transmits a radio line setting request to the radio base station 5 via the radio base station protocol terminator 43 (c21 in FIG. 10).

Also, the radio base station controller 4 transmits a radio line setting request to the mobile terminal 6 via the mobile terminal protocol terminator 41 (c22 in FIG. 10). In this state, the bearer quality control part 42 in the uplink direction within the radio base station controller 4 controls the uplink bearer quality at BLER=0.0 (c23 in FIG. 10), enabling the stable communication between the mobile terminal 6 and the radio base station 5 (c24 in FIG. 10).

During this communication, when there is a greater amount of interference due to an increased number of users so that the radio quality measured by the radio quality measuring part 51 of the radio base station 5 exceeds Threshold=xx, the radio base station 5 issues a radio quality worsening report (report value=yy) to the radio base station controller 4 (c31 in FIG. 10).

Within the radio base station controller 4, the bearer quality control part 42 changes the quality of the corresponding bearer (BLER=0.05) (c32 in FIG. 10) (steps S21, S25, S26 in FIG. 12). Moreover, the bearer quality control part 42 transmits a radio quality change request to the radio base station 5 to adapt to the reset bearer quality (c33 in FIG. 10)(step S27 in FIG. 12). The radio quality control part 52 of the radio base station 5 having received the radio quality change request decreases the required radio quality to a specified value.

Moreover, if the radio quality being measured by the radio quality measuring part 51 of the radio base station 5 exceeds Threshold=zz, the radio base station 5 transmits the radio quality worsening report (report value=zz) to the radio base station controller 4 again (c34 in FIG. 10).

Within the radio base station controller 4, the bearer quality control part 42 changes the quality of the corresponding bearer (BLER=0.1) (c35 in FIG. 10) (steps S21, S22, S23 in FIG. 12). Moreover, the bearer quality control part 42 transmits a radio quality change request to the radio base station 5 to adapt to the reset bearer quality (c36 in FIG. 10)(step S24 in FIG. 12). The radio quality control part 52 of the radio base station 5 having received the radio quality change request decreases the required radio quality to a specified value.

Lastly, when there is less interference from other users and the radio quality being measured by the radio quality measuring part 51 of the radio base station 5 is below Threshold, the radio base station 5 issues a radio quality improvement report (report value=xx) to the radio base station controller 4 (c41 in FIG. 10).

Within the radio base station controller 4, the bearer quality control part 42 resets the corresponding bearer quality at BLER=0.0 (c42 in FIG. 10) (steps S21, S25, S28 in FIG. 12). Moreover, the bearer quality control part 42 transmits a radio quality change request to the radio base station 5 to adapt to the reset bearer quality (c43 in FIG. 10)(step S29 in FIG. 12). The radio quality control part 52 of the radio base station 5 having received the radio quality change request increases the required radio quality to a specified value.

Thereby, in this embodiment, the total power received at the radio base station 5 is decreased, so that the total amount of interference is reduced, the number of mobile terminals accommodated is increased. Since the power control in each of the embodiments of the invention is controlled independently, the communication quality control or communication capacity control is made more efficiently by performing the power control at the same time.

As described above, with this invention, the conflicting abilities of making the high quality communication and keeping the number of mobile terminals accommodated are controlled efficiently by employing the configuration and operation of the invention.

What is claimed is:

1. A mobile communication system comprising:
a radio base station controller for performing at least a radio line link control and a resource control for a radio base station, and at least a radio line link control, a resource control and a bearer control for a mobile terminal,
wherein said radio base station controller comprises control means for controlling a communication quality between said radio base station and said mobile terminal on the basis of information regarding the amount of interference from said radio base station, the information being based on a comparison result between a value of a radio quality and preset thresholds including a first threshold, a second threshold and a third threshold, and
wherein the mobile communication system comprises a bearer quality control part, said bearer quality control part updating a quality of a corresponding bearer when said control means of the radio base station controller determines a change in the communication quality between said radio base station and said mobile terminal.

2. The mobile communication system according to claim 1, wherein said radio base station comprises means for measuring the radio quality between said mobile terminal and it, and means for notifying the information regarding said amount of interference.

3. The mobile communication system according to claim 1, wherein said control means makes the communication by maximizing said communication quality when said amount of interference is small, and requests either said radio base station or said mobile terminal to degrade said communication quality when said amount of interference is large.

4. The mobile communication system according to claim 1, wherein said bearer quality control part updates the quality of the corresponding bearer using a power control to change transmitting power in accordance with changes in the bearer required quality,and wherein the power control of said communication quality is made in at least one of an uplink and a downlink between said radio base station and said mobile terminal.

5. A mobile communication system comprising a radio base station controller for performing at least a radio link control and a resource control for a radio base station, and at least a radio link control, a resource control and a bearer control for a mobile terminal,
wherein said radio base station controller comprises control means for controlling a communication quality between said radio base station and said mobile terminal on the basis of information regarding the amount of interference from said radio base station,
wherein the mobile communication system comprises a bearer quality control part,
wherein said control means enables the high quality communication by causing the bearer quality control part to increase a bearer required quality of said mobile terminal when said amount of interference is relatively small, and by causing the bearer quality control part to degrade said bearer required quality to a needed minimum level in the order from the mobile terminal of lower service class during communication when said amount of interference is larger due to an increased number of users.

6. A radio base station controller for performing at least a radio link control and a resource control for a radio base station, and at least a radio link control, a resource control and a bearer control for a mobile terminal,
wherein said radio base station controller comprises control means for controlling a communication quality between said radio base station and said mobile terminal on the basis of information regarding the amount of interference from said radio base station, the information being based on a comparison result between a value of a radio quality and preset thresholds including a first threshold, a second threshold and a third threshold, and
wherein the radio base station controller comprises a bearer quality control part, said bearer quality control part updating a quality of a corresponding bearer when said control means determines a change in the communication quality between said radio base station and said mobile terminal.

7. The radio base station controller according to claim 6, wherein said control means enables the communication by causing the bearer quality control part to increase said communication quality when said amount of interference is small, and by requesting the bearer quality control part to cause either said radio base station or said mobile terminal to degrade said communication quality when said amount of interference is large.

8. The radio base station controller according to claim 6, wherein said bearer quality control part updates the quality of the corresponding bearer using a power control to change transmitting power in accordance with changes in the bearer required quality, and wherein the power control of said communication quality is made in at least one of an uplink and a downlink between said radio base station and said mobile terminal.

9. A radio base station controller for performing at least a radio link control and a resource control for a radio base station, and at least a radio link control, a resource control and a bearer control for a mobile terminal,
  wherein said radio base station controller comprises a bearer quality control part and control means for controlling a communication quality between said radio base station and said mobile terminal on the basis of information regarding the amount of interference from said radio base station,
  wherein said control means enables the high quality communication by causing the bearer quality control part to increase a bearer required quality of said mobile terminal when said amount of interference is relatively small, and by causing the bearer quality control part to degrade said bearer required quality to a needed minimum level in the order from the mobile terminal of lower service class during communication when said amount of interference is larger due to an increased number of users.

10. A transmitting and receiving power control method for use in a mobile communication system comprising a radio base station controller for performing at least a radio link control and a resource control for a radio base station, and at least a radio link control, a resource control and a bearer control for a mobile terminal, said method comprising, on the side of said radio base station controller,
  a step of controlling a communication quality between said radio base station and said mobile terminal on the basis of information regarding the amount of interference from said radio base station, the information being based on a comparison result between a value of a radio quality and preset thresholds including a first threshold, a second threshold and a third threshold, the step of controlling the communication quality further comprising using a bearer quality control to update a quality of a corresponding bearer when a change in the communication quality between said radio base station and said mobile terminal is determined.

11. The transmitting and receiving power control method according to claim 10, wherein said method comprises a step of measuring the radio quality between said mobile terminal and said radio base station, and a step of notifying the information regarding said amount of interference.

12. The transmitting and receiving power control method according to claim 10, wherein said step of controlling the communication quality comprises enabling the communication by causing the bearer quality control to increase said communication quality when said amount of interference is small, and requesting the bearer quality control to cause either said radio base station or said mobile terminal to degrade said communication quality when said amount of interference is large.

13. The transmitting and receiving power control method according to claim 10, wherein power control with said communication quality is made in at least one of an uplink and a downlink between said radio base station and said mobile terminal.

14. A transmitting and receiving power control method for use in a mobile communication system comprising a radio base station controller for performing at least a radio link control and a resource control for a radio base station, and at least a radio link control, a resource control and a bearer control for a mobile terminal, said method comprising, on the side of said radio base station controller,
  a step of controlling a communication quality between said radio base station and said mobile terminal on the basis of information regarding the amount of interference from said radio base station, and
  a step of updating a quality of a bearer using a bearer quality control when a change in the communication quality between said radio base station and said mobile terminal is determined;
  wherein said step of controlling the communication quality comprises enabling the high quality communication by causing the bearer quality control to increase a bearer required quality of said mobile terminal when said amount of interference is relatively small, and requesting the bearer quality control to degrade said bearer required quality to a needed minimum level in the order from the mobile terminal of lower service class during communication when said amount of interference is larger due to an increased number of users.

* * * * *